(12) United States Patent
Sheppard et al.

(10) Patent No.: US 10,677,377 B2
(45) Date of Patent: Jun. 9, 2020

(54) CONDUIT CLIP AND CONDUIT CLIP ARRANGEMENT WITH A CONDUIT CLIP AND A CONDUIT

(71) Applicant: ABB Limited, Warrington (GB)

(72) Inventors: Luke Sheppard, Birmingham (GB); Meirion Buck, Sutton Coldfield (GB)

(73) Assignee: ABB LIMITED, Warrington, Cheshire (GB)

( * ) Notice: Subject to any disclaimer, the term of this patent is extended or adjusted under 35 U.S.C. 154(b) by 0 days.

(21) Appl. No.: 16/147,891

(22) Filed: Oct. 1, 2018

(65) Prior Publication Data

US 2019/0032817 A1 Jan. 31, 2019

Related U.S. Application Data

(63) Continuation of application No. PCT/EP2017/058485, filed on Apr. 10, 2017.

(30) Foreign Application Priority Data

Apr. 13, 2016 (EP) .................................... 16165160

(51) Int. Cl.
*F16L 3/10* (2006.01)
*B60R 16/02* (2006.01)
(Continued)

(52) U.S. Cl.
CPC ........ *F16L 3/1075* (2013.01); *B60R 16/0215* (2013.01); *F16L 57/02* (2013.01);
(Continued)

(58) Field of Classification Search
CPC ... F16L 3/10; F16L 3/11; F16L 3/1008; F16L 3/1075; F16L 3/1025; H02G 3/32
(Continued)

(56) References Cited

U.S. PATENT DOCUMENTS 3,456,965 A * 7/1969 Harrison ............. A61M 1/3655
285/260
4,426,754 A * 1/1984 Smith ....................... F16L 3/23
24/115 R
(Continued)

FOREIGN PATENT DOCUMENTS

DE 102006025706 A1 12/2007
DE 202007012036 U1 1/2009
(Continued)

*Primary Examiner* — Patrick F Brinson
(74) *Attorney, Agent, or Firm* — Leydig, Voit & Mayer, Ltd.

(57) ABSTRACT

A conduit clip for use in a conduit clip arrangement together with a conduit includes: a ring member adapted to be placed around the conduit, the ring member having a through axis, a circumferential radially internal surface, and a circumferential radially external surface, the ring member comprising semi-circular ring portions connected by a living hinge. The circumferentially external surface has a circumferentially smooth envelope. Each side wall of the ring member is provided with a clamping device that cooperates with an attachment member. The circumferential radially internal surface has at least one upstanding projection configured to engage a groove in the conduit sheath when placed around it.

17 Claims, 12 Drawing Sheets

(51) Int. Cl.
*F16L 57/02* (2006.01)
*F16L 57/06* (2006.01)
*H02G 3/32* (2006.01)
*H02G 3/04* (2006.01)

(52) U.S. Cl.
CPC ............ *F16L 57/06* (2013.01); *H02G 3/0456* (2013.01); *H02G 3/32* (2013.01)

(58) Field of Classification Search
USPC .................. 138/106, 107; 285/156, 419, 903
See application file for complete search history.

(56) References Cited

U.S. PATENT DOCUMENTS

| | | | | |
|---|---|---|---|---|
| 4,443,031 | A * | 4/1984 | Borsh | F16L 25/0045 285/419 |
| 5,015,013 | A * | 5/1991 | Nadin | F16L 25/0045 285/419 |
| D363,977 | S * | 11/1995 | Streit | D23/263 |
| D371,431 | S * | 7/1996 | Streit | D23/263 |
| 7,350,834 | B2 * | 4/2008 | Ryhman | F16L 23/04 285/406 |
| 7,581,564 | B2 * | 9/2009 | Tanaka | F16L 21/06 138/110 |
| 7,661,631 | B2 * | 2/2010 | Ibaraki | F16L 3/1025 248/68.1 |
| D640,536 | S * | 6/2011 | Larsen | D8/394 |
| 8,235,332 | B2 * | 8/2012 | Cesarino | B60R 16/0215 248/65 |
| 8,833,706 | B2 * | 9/2014 | Elsmore | H02G 3/32 138/106 |

FOREIGN PATENT DOCUMENTS

| | | |
|---|---|---|
| EP | 2075887 A1 | 7/2009 |
| WO | WO 2011018605 A1 | 2/2011 |

* cited by examiner

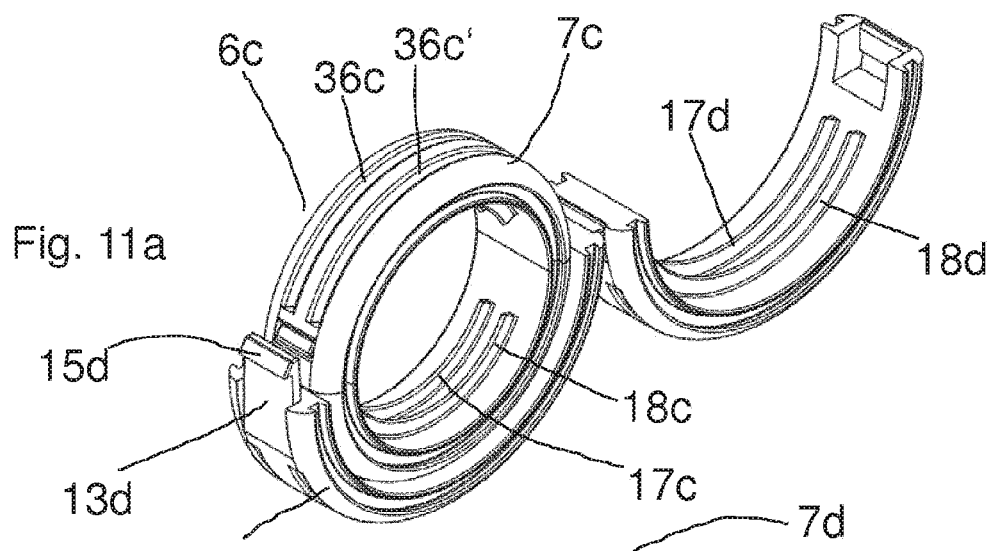
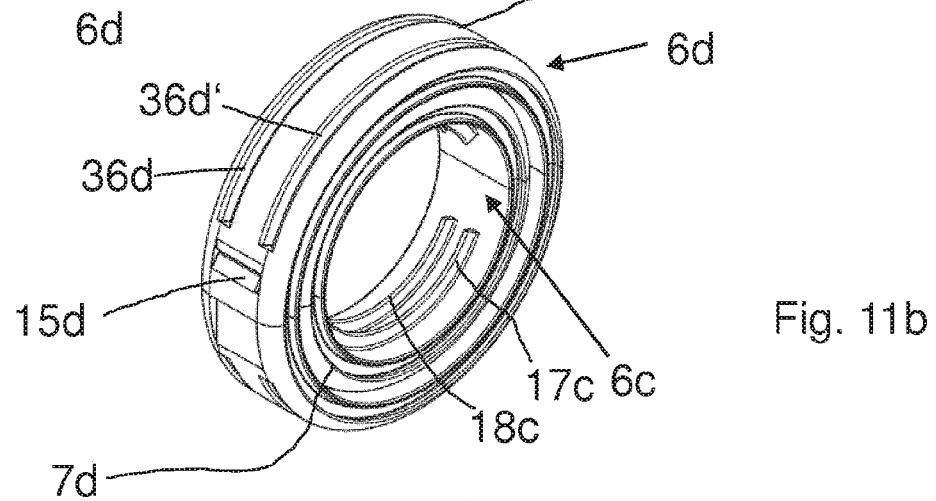
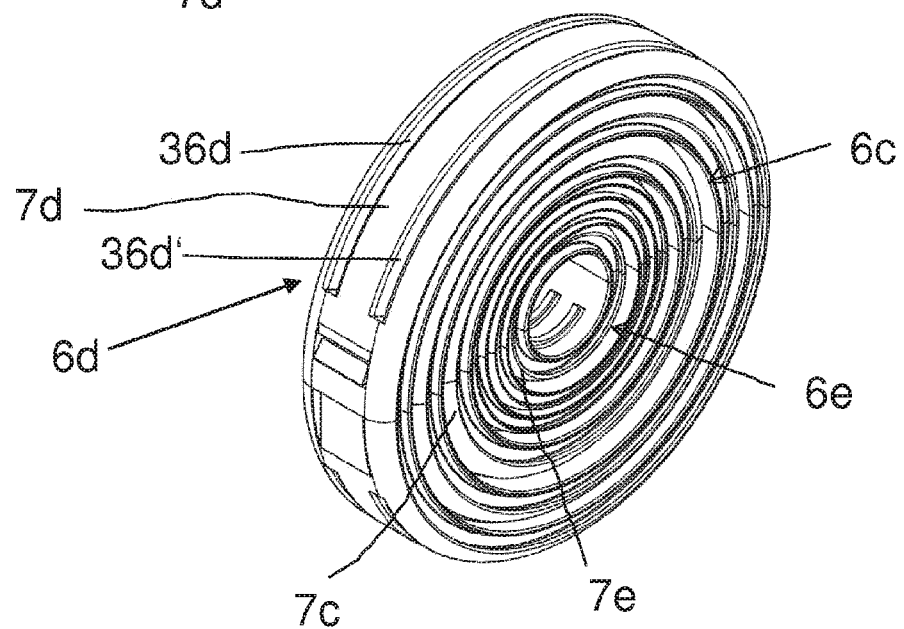

CONDUIT CLIP AND CONDUIT CLIP ARRANGEMENT WITH A CONDUIT CLIP AND A CONDUIT

CROSS-REFERENCE TO PRIOR APPLICATION

This application is a continuation of International Patent Application No. PCT/EP2017/058485, filed on Apr. 10, 2017, which claims priority to European Patent Application No. EP 16165160.9, filed on Apr. 13, 2016. The entire disclosure of both applications is hereby incorporated by reference herein.

FIELD

The invention is about a conduit clip and a conduit clip arrangement.

BACKGROUND

Such a conduit clip and conduit clip arrangement are used for clipping a conduit, typically a conduit for electric cables or fluids, to a substructure for retention purposes. Such conduits are often flexible and must be confined to follow a designated path between end attachment locations. For example a cable harness of a vehicle requires to be clipped around an engine bay so as to be connected to components without risk of straining, or damage from hot and/or moving components or abrasion.

Flexible conduits are made as flexible metallic conduits, flexible plastic conduits or flexible plastic conduits that are lengthwise slit parallel to the through axis along its length. To improve flexibility, flexible conduits often have a corrugated external surface, internal surface may also be corrugated to further increase flexibility.

The prior art knows conduit clip arrangements where a flexible conduit is mounted to a mounting substrate by using conduit clips, which are placed over the conduit, said conduit clips being designed to be fixed to a mounting substrate using cable ties or integrally moulded attachment members.

As an example, WO 2011/018605 A1 shows a conduit attachment comprising a ring member adapted to be placed over a conduit, said ring member having a through axis and a circumferential radially external surface, said surface having axially spaced shoulders thereon to define a substantially circular arcuate track in the circumference direction, said track being adapted to receive a cable tie. The ring member is split to allow opening and closing thereof and comprises semi-circular ring portions which are connected by a living hinge, said ring member includes a releasable latch engageable in the closed condition thereof. The ring member further includes an integrally moulded attachment member with a snap-fitting protection or with a hole in order to increase the mounting possibilities for the ring member.

The known conduit clip and conduit clip arrangements lack ease and flexibility of application and simplicity of design.

SUMMARY

In an embodiment, the present invention provides a conduit clip for use in a conduit clip arrangement together with a conduit, the conduit clip comprising: a ring member configured to be placed around the conduit, the ring member having a through axis, a circumferential radially internal surface, and a circumferential radially external surface, the ring member comprising semi-circular ring portions connected by a living hinge, wherein the circumferentially external surface has a circumferentially smooth envelope, wherein each side wall of the ring member is provided with a clamping device configured to cooperate with an attachment member, and wherein the circumferential radially internal surface has at least one upstanding projection configured to engage a groove in the conduit sheath when placed around it.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2*a* shows a ring member according to the invention in open configuration while FIG. 7*a* shows a topside view of an attachment member for use in a third embodiment of the invention while FIG. 8*a* shows a topside view of an attachment member for use in a fourth embodiment of the invention while FIG. 9*a* shows a topside view of an attachment member for use in a fifth embodiment of the invention while FIG. 10*a* shows a conduit clip in a further embodiment in closed configuration while FIG. 11*a* shows stacking of two conduit clips according to the invention into each other, an outer conduit clip thereof in an open configuration, FIG. 11*b* shows stacking of two conduit clips, both in a closed configuration, and FIG. 11*c* shows stacking of three conduit clips into each other, FIG. 13*a* shows how an arrangement of stacked conduit clips according to an embodiment of the invention are used to match conduits with different diameters to a fitting, the top cover being removed, while

DETAILED DESCRIPTION

Figure 1:
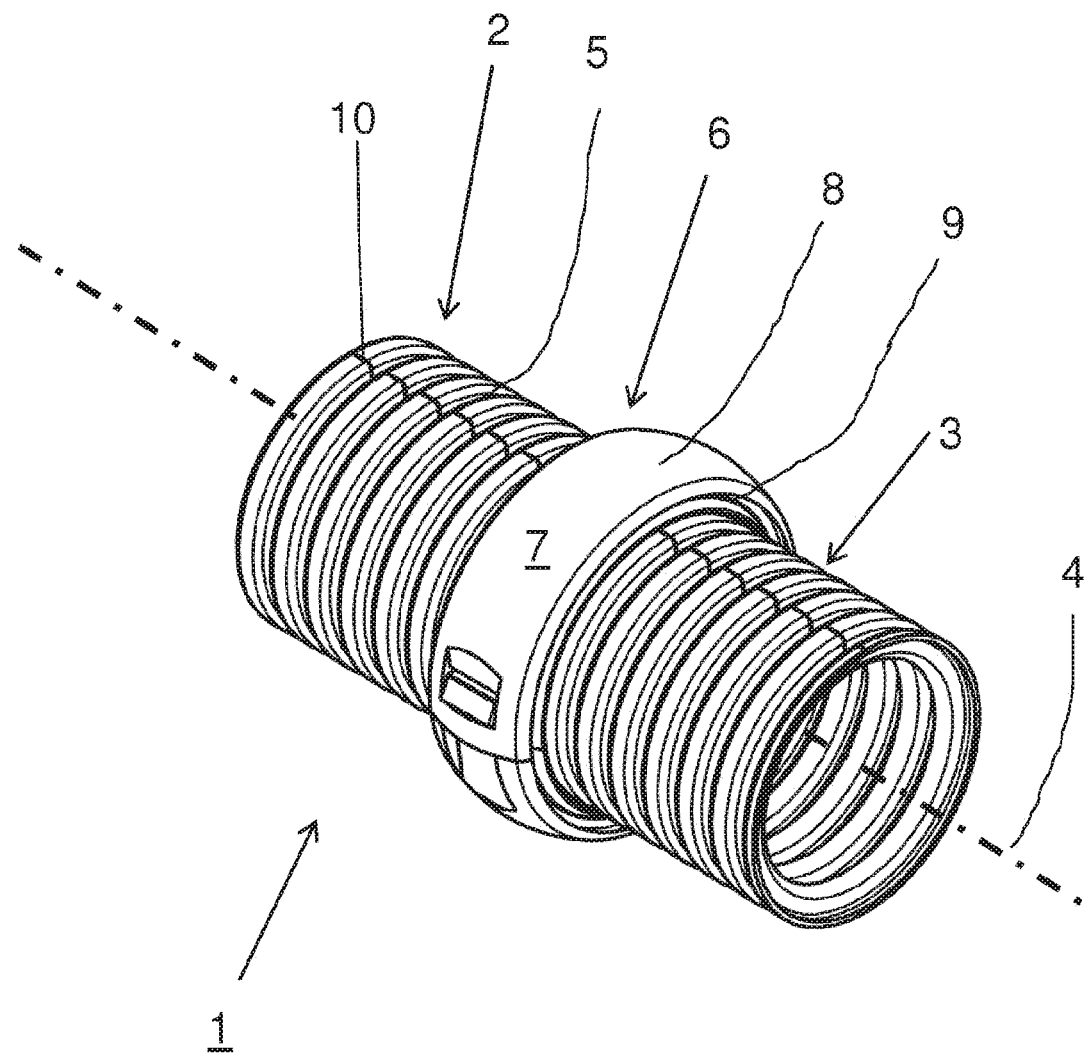
FIG. 1 shows a conduit clip arrangement according to a first embodiment of the invention.

In an embodiment, the present invention provides a conduit and a conduit clip arrangement which have a simple design, can be used in a space-saving manner for more purposes than just fixing a conduit to a mounting substrate, and can be applied in a simple and space-saving manner.

So according to the invention, a conduit clip is wherein said circumferentially external surface has a circumferentially smooth envelope, that each side wall of said ring member is provided with a clamping device configured to cooperate with an attachment member, and that said circumferential radially internal surface has at least one upstanding projection configured to engage a groove in the conduit sheath when placed around it.

A circumferentially smooth envelope of the external surface the conduit clip means that there are no projections, particularly no parts or sections, extending radially out of the external circumferential surface, which has the advantage that a conduit clip according to the invention does not consume much space in radial direction when placed around a conduit. The conduit clip according to the invention thus can beneficially be used in cooperation with a flexible conduit in a first application as a kind of stabilization means, to maintain the form and geometry of the conduit and to provide a crush resistance. This advantage is particularly helpful in a preferred embodiment of the invention where the grooved outer form of a conduit around which the conduit clip is positioned is lengthwise split parallel to the through axis. The flexible conduit in this embodiment is a split conduit. The conduit clip arrangement according to the invention provides a stabilization and maintaining of the form and geometry and a crush resistance of such a split conduit.

According to a preferred embodiment, the projection is shaped as a circular rib.

According to a preferred embodiment said ring member includes a latch engageable in the closed condition thereof.

According to a preferred embodiment said latch is releasable.

According to a preferred embodiment the ring member has at least one groove embossed in its circumferentially extending surface and extending lengthwise in a circumferential direction. Due to the embossing, the circumferentially smooth envelope of the external surface will not be affected in the sense that still no projections, particularly no parts or sections, extending radially out of the external circumferential surface. The advantage of this embodiment is that it enables a stacking of different sized conduit clips into each other. Two or more conduit clips with different diameters can be assembled into each other creating an enlarger or reducer means. The two or more conduit clips to be stacked or assembled into each other would be designed in such a manner that the outer diameter of a first, smaller conduit clip, measured at the circumferentially smooth envelope, fits the inner diameter of a second, larger conduit clip. The at least one upstanding projection at the radially internal surface of the second, larger conduit clip fits into the at least one groove embossed in the circumferentially extending surface of the first, smaller conduit clip, so that due to the projection fitting into the groove both conduit clips when assembled into each other are coupled to each other and circular rotation of one of the conduit clips around the other is avoided. The assembly of two such conduit clips into each other is enabled due to the inventive feature of the circumferentially smooth envelope of the external surface the conduit clip.

According to a preferred embodiment the ring member has a number of grooves embossed in its circumferentially extending surface and extending lengthwise in a circumferential direction, wherein the grooves are matching in number and position and so engaging with the upstanding projections at the circumferential radially internal surface.

A further advantage such a conduit clip design according to the invention offers is that such conduit clips can be used to reduce outlets size of existing products allowing the use of different sized conduits. For example, if a conduit with a small diameter is to be coupled to a fitting with a larger diameter than the conduit, then for adapting the small diameter of the conduit to the larger diameter of the fitting, one or more conduit clips according to the invention are assembled into each other around the end piece of the conduit, until the outer diameter of the conduit clip arrangement fits the inner diameter of the fitting.

According to a preferred embodiment the ring member has at least one flattening embossed in a center portion of a segment of its circumferentially extending surface, in such a way that the edge portions in this segment remain unaffected and form circularly shaped edge portions of the flattening. A conduit clip according to this embodiment can be used with a cable tie, without losing the advantage of the circumferentially smooth envelope. The envelope is defined by the circularly shaped edge portions of the flattening, which is the same as in the embodiment without flattening. So a cable tie will be inserted on the flattening an held and guided by and between the circularly shaped edge portions, without adding any radially extending parts or portions.

In another application it might be required that a flexible conduit be fastened to a mounting structure. With the conduit clip arrangement according to the invention, thanks to the clamping device at the side walls of the ring member, very easily an attachment member can clamped to the ring member. Ring member with clamped attachment member now is used to fix the flexible conduit to its supporting structure, for example side walls of an engine bay.

The upstanding projection at the internal surface of the ring member may engage with a groove, for example a corrugation in the external surface of the flexible conduit, and thus prevents a relative axial movement of the ring member and the conduit. The attached upstanding projection is free to rotate fully 360° around the circumference of the flexible conduit to allow full flexibility in fixing locations.

According to an advantageous embodiment, the grooved armoured sheath of the conduit has a circumferential radially external surface with a number of axially adjacent circular corrugations.

According to an advantageous embodiment, the grooved armoured sheath is lengthwise split parallel to the through axis.

According to an advantageous embodiment, said conduit clip arrangement further comprises an attachment member, said attachment member and the ring member being arranged to clamp together.

According to an advantageous embodiment, said clamping device is a circumferential groove and said attachment member has a mounting section which provides abutments to engage in the circumferential groove for clamping the attachment member to the ring member. The design of the clamping device and attachment member according to this embodiment allows the attachment member to be shifted freely in both directions along the circumference of the conduit clip when assembled. This improves the ease of installation and reduces torsional stress on the conduit as it is free to run.

According to an advantageous embodiment, said attachment member has a fixing section providing a fixture element for attaching the attachment member with clamped conduit clip at a mounting location.

According to an advantageous embodiment, the fixture element is a fir tree type fixture or an arrow head type fixture or a p clip type fixture having a hole or a stud mount type fixture.

FIG. 1 shows a conduit clip arrangement 1 according to a first embodiment of the invention. A flexible conduit 2 has a generally cylindrical shape with a through axis 4 and a grooved outer form 3. The flexible conduit 2 is made as a flexible metallic conduit or a flexible plastic conduit. The grooved outer form is formed by a number of axially adjacent circular corrugations placed side by side on the surface of the conduit 2, which gives the flexible conduit 2 a corrugated external surface. The internal surface is also corrugated here. The corrugations on the external and internal surface increase flexibility.

The grooved outer form 3 of the conduit 2 is lengthwise split parallel to the through axis 4, forming a slot 10 extending in the surface of the conduit 2, parallel to the through axis 4. The embodiment as a split conduit facilitates insertion of cables into the conduit 2.

A conduit clip 6 having a ring member is placed over the conduit 2. The conduit clip 6 has a ring member 7 having a through axis, a circumferential radially internal surface and a circumferential radially external surface. The circumferentially external surface 8 has a smooth surface texture. This makes the ring member 7 rather flat and it does not consume much space when placed over the conduit 2. The ring member 7 when placed over the split flexible conduit 2 maintains the form and geometry of the split conduit and provides crush resistance.

Each side wall of the ring member 7 is provided with a clamping device in the form of a circumferential groove 9 which is configured to cooperate with an attachment member, see FIGS. 3-9b and description below.

Figure 2A:
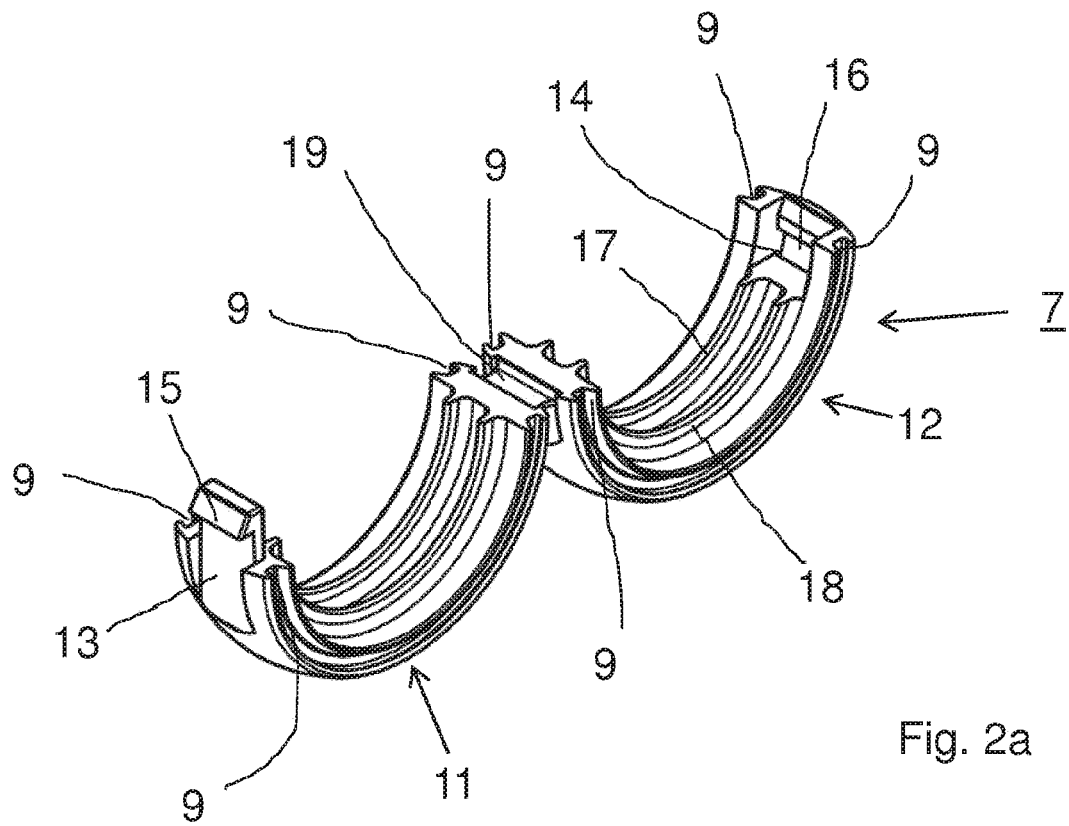
Figure 2B:
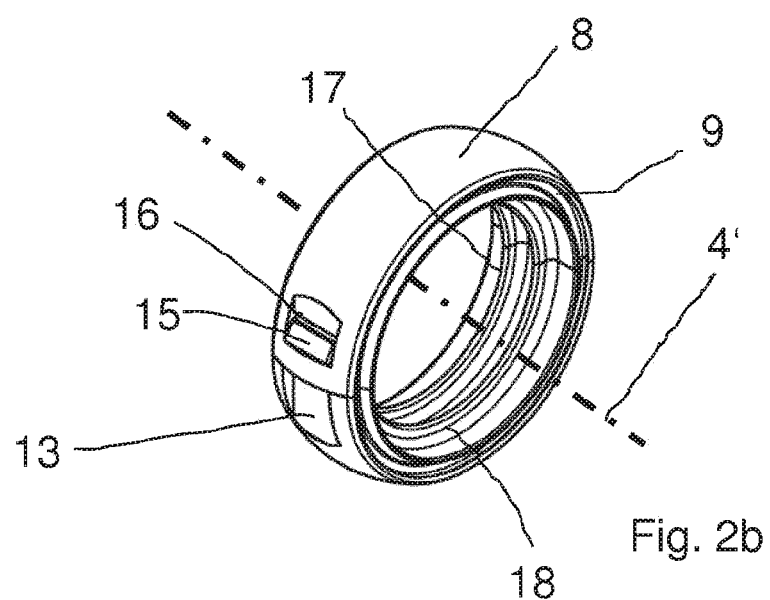
FIG. 2*b* shows the ring member in a closed configuration.

FIGS. 2a-2b show details of the ring member 7. The ring member 7 comprises two semi-circular ring portions 11, 12 connected or joined by a living hinge 19. The ring member 7 may be of any suitable plastic material having the required strength and resilience. FIG. 2a shows the ring member 7 in the open condition, FIG. 2b shows the ring member 7 in the closed condition. In the closed condition the ring member 7 has a through axis 4'. When the ring member 7 is placed over the conduit 2 the through axis 4 and 4' fall together.

As seen in FIG. 2a, a male flap 13 of one member 11 is engageable in a kind of female recess 14 of the other member 12. It is retained by a nose 15 of the flap 13 engaging in an aperture 16 of the recess 14. The flap 13 and recess 14 comprise a releasable latch. In the closed position, the aperture 16 allows the flap 13 to be released by push through of a tool, such as screwdriver blade.

Within the ring member 7, there are two upstanding projections 17, 18, which are typically circular and substantial continuous. They are meant to engage and locate into the corrugations of the conduit 2 when the ring member is placed over the conduit 2, and thus keep the ring member 7 in its position on the conduit 2 and prevent an axial shifting of the ring member along the axis 4 of the conduit 2.

Figure 3:
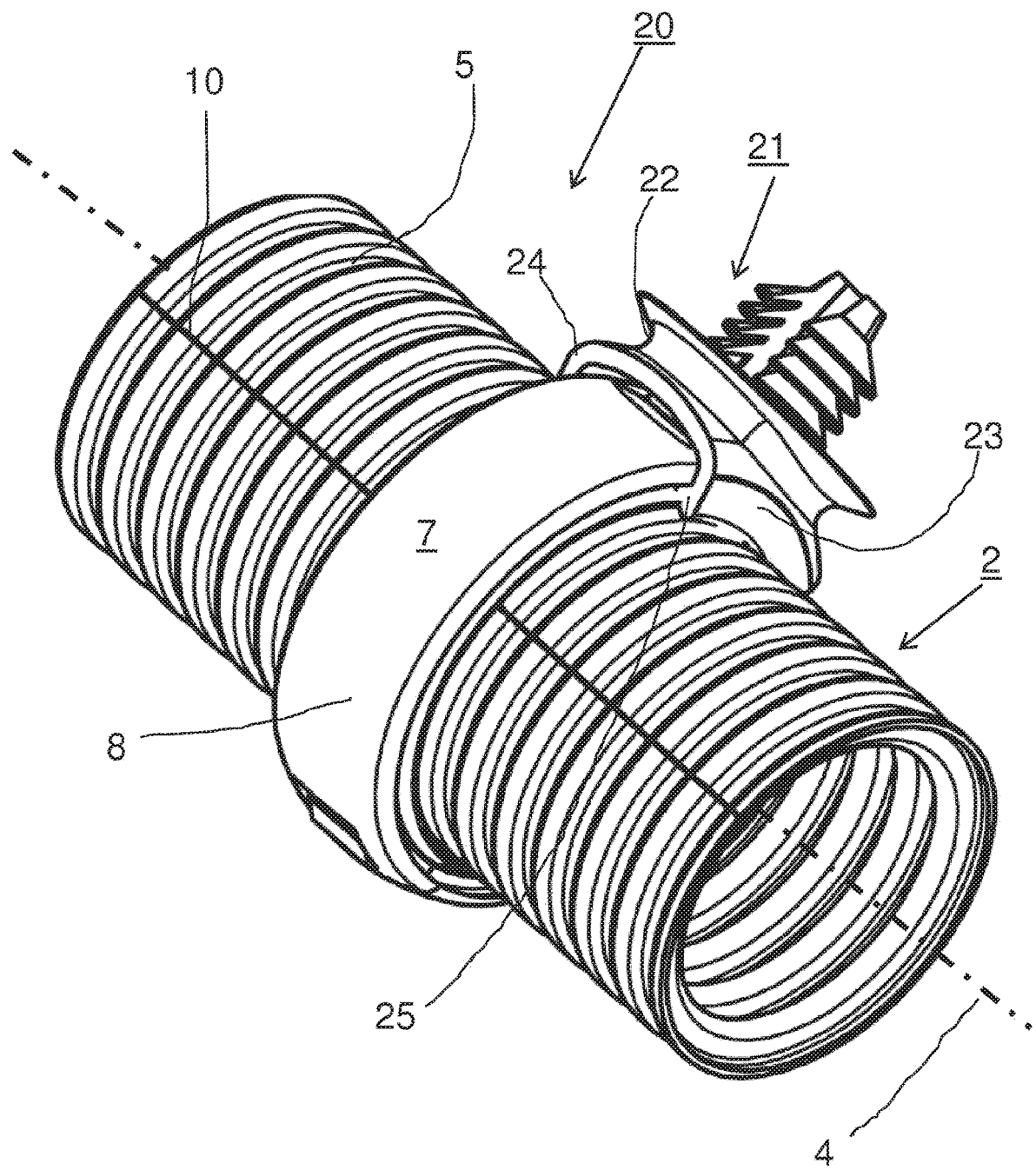
FIG. 3 shows a conduit clip arrangement according to a second embodiment of the invention

FIG. 3 shows a conduit clip arrangement 20 according to a second embodiment of the invention. It comprises an attachment member 21. The attachment member 21 is a separate part, see also FIGS. 5-9b. The attachment member 21 and the ring member 7 are clamped together. For that purpose, attachment member 21 has a mounting section 22 which provides abutments 23, 24 with clamping noses 25, 26, see also FIG. 4 for further detail, to engage in the circumferential groove 9 for clamping the attachment member 21 with its mounting section 22 to the ring member 7. The attachment member 21 can travel freely, in both directions, along the circumference of the conduit clip 6 resp. the ring member 7 when assembled. This improves the ease of installation and reduces torsional stress on the conduit 2 as it is free to turn.

Figure 4:
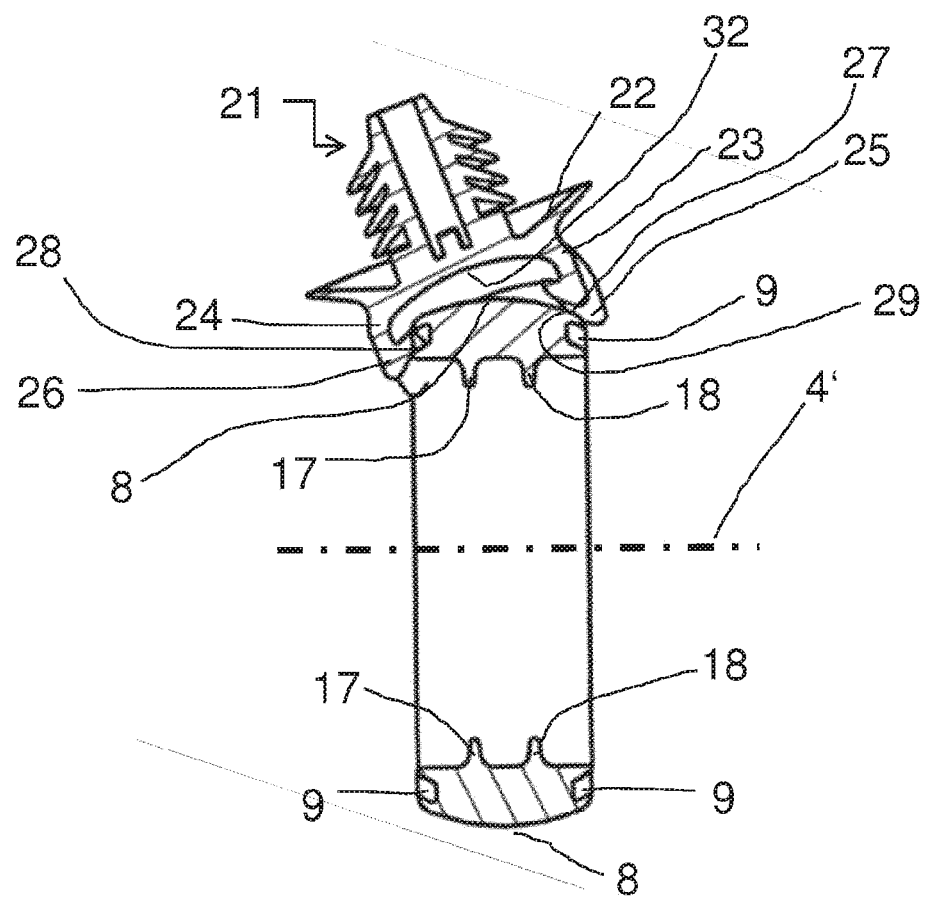
FIG. 4 shows a cross-section of the ring member according to the embodiment shown in FIG. 3.
Figure 5:
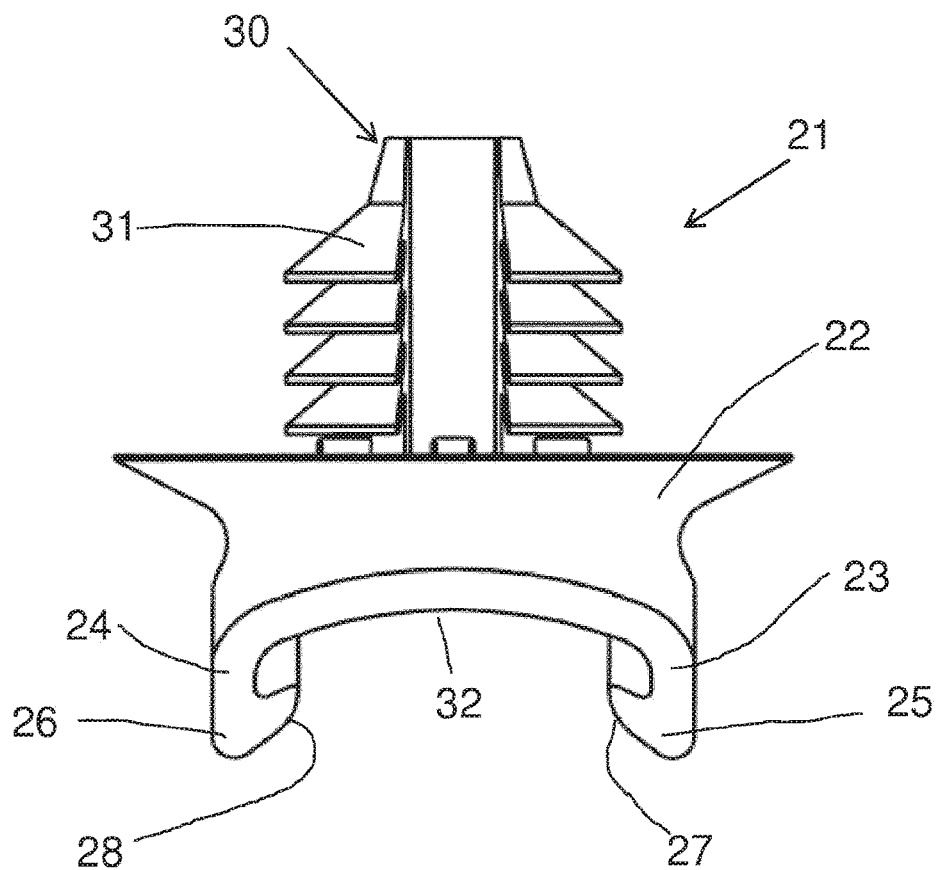
FIG. 5 shows a cross-sectional view of the attachment member used in the embodiment of FIG. 3.
Figure 6:
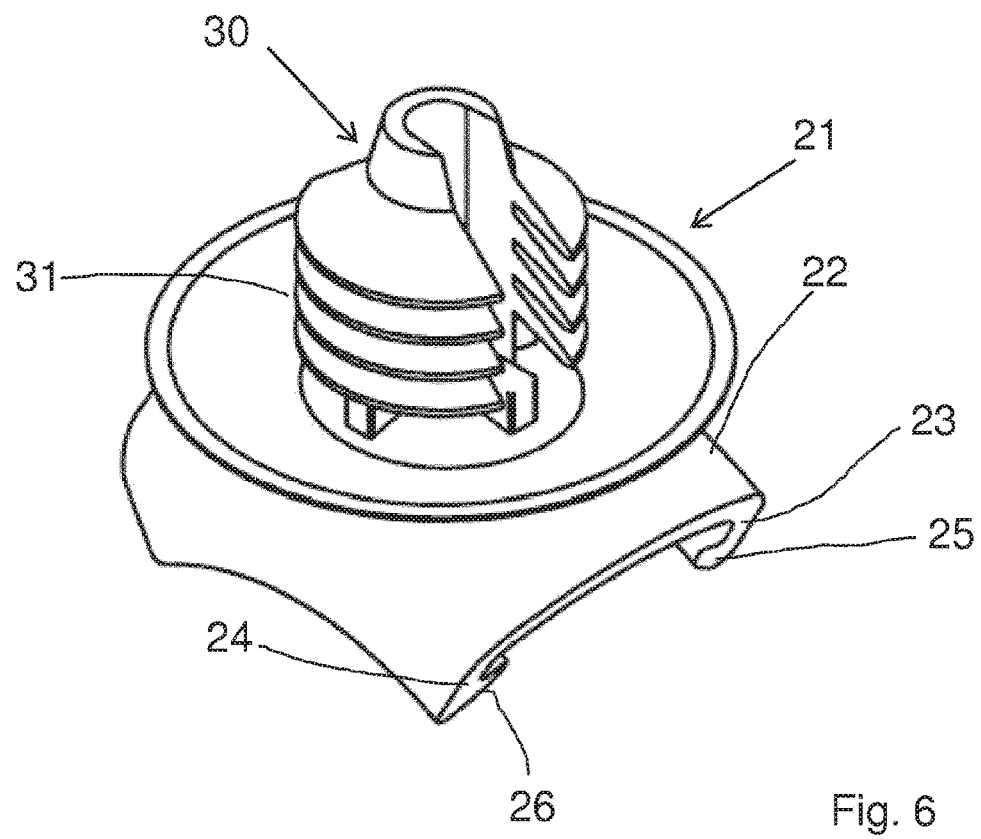
FIG. 6 shows a perspective view of the attachment member used in the embodiment of FIG. 3.

FIG. 4 shows a cross-sectional view of the embodiment of FIG. 3. The attachment member 21 is shown in an intermediate position in the process of being clipped onto the ring member 7. The clamping noses 25, 26 and the circumferential groove 9 provide shoulders for engagement in the clamped position, and they provide inclined surfaces 27, 28, 29 (for additional detail see FIG. 5) which can slide over one another in the application of clamping the mounting section 22 onto the ring member 7 as the mounting section 22 is moved toward the ring member 7. The shoulders slide over one another, so that the shoulders can snap into engagement to hold the mounting section 22 clamped fixedly to the ring member 7.

It can be seen that the interior surface of the mounting section 22 is adapted to fit in shape and contour to the external surface 8 of the ring member 7, to ensure a form fit when the attachment member 21 is clamped to the ring member 7.

The attachment member 21 has a fixing section 30 providing a fixture element 31 for attaching the attachment member 21 with clamped conduit clip resp. ring member 7 at a mounting location. FIGS. 3, 4, 5 and 6 show as an example the fixture element 31 in the form of a fir tree fixture.

Figure 7A:
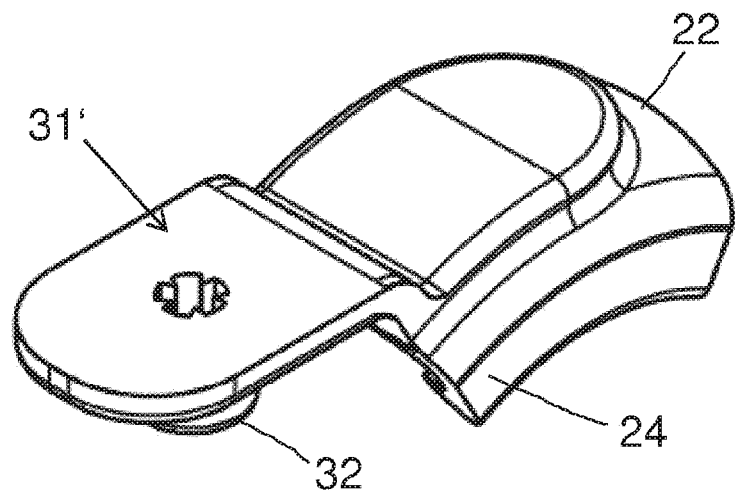
Figure 7B:
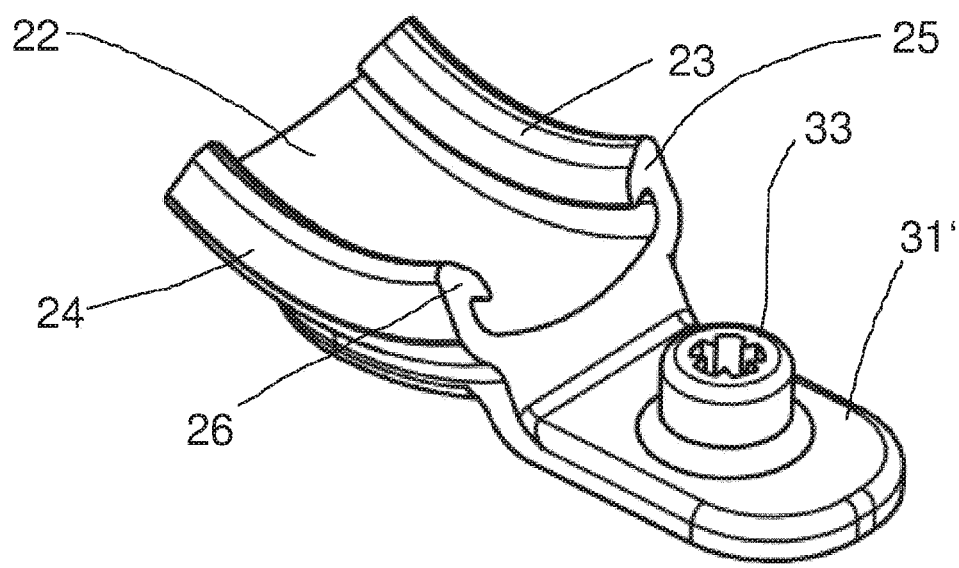
FIG. 7*b* shows a bottom-side view of that attachment member.

Other types of fitting and features can be used with the fixing means. FIG. 7a shows a topside view and FIG. 7b a bottom-side view of an embodiment, where the fixing means 31' is a stud mount with a stud 32.

Figure 8A:
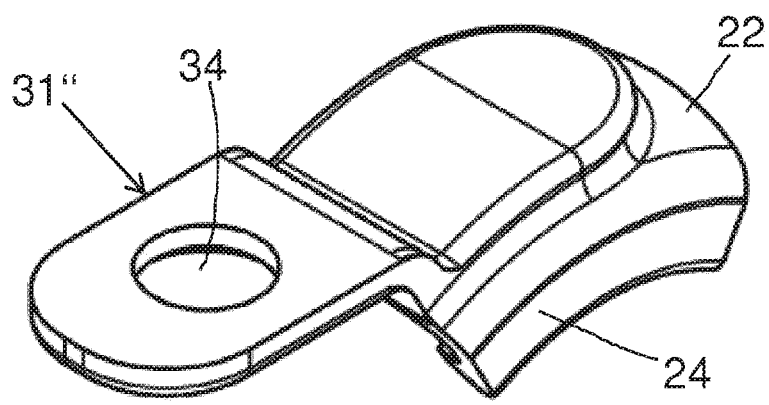
Figure 8B:
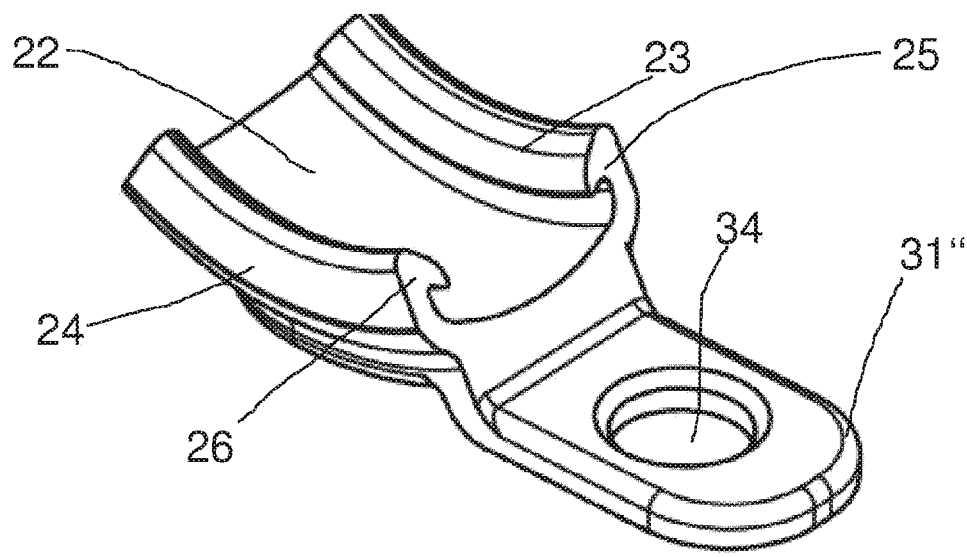
FIG. 8*b* shows a bottom-side view of that attachment member.

FIG. 8a shows in a topside view and FIG. 8b bottom-side view of an embodiment, where the fixing means 31" is a p-clip type fixture hole mount with a fixture hole 34.

Figure 9B:
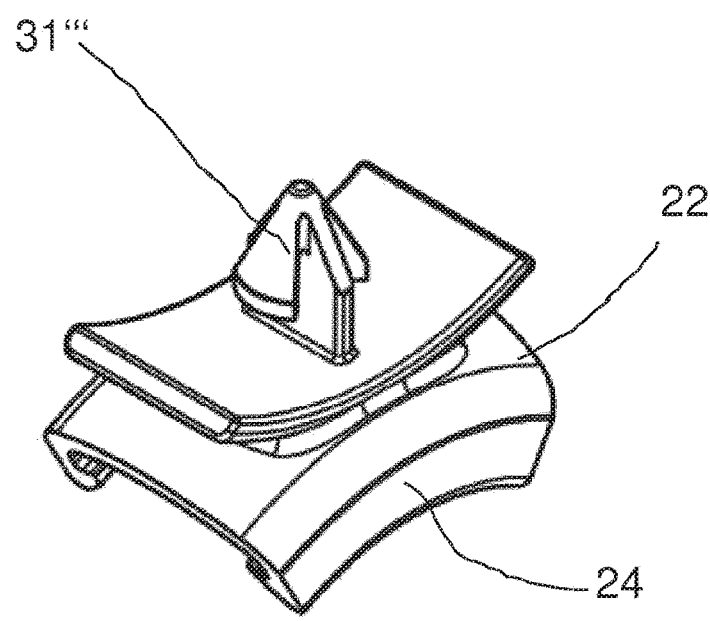
FIG. 9*b* shows a bottom-side view of that attachment member.
Figure 9A:
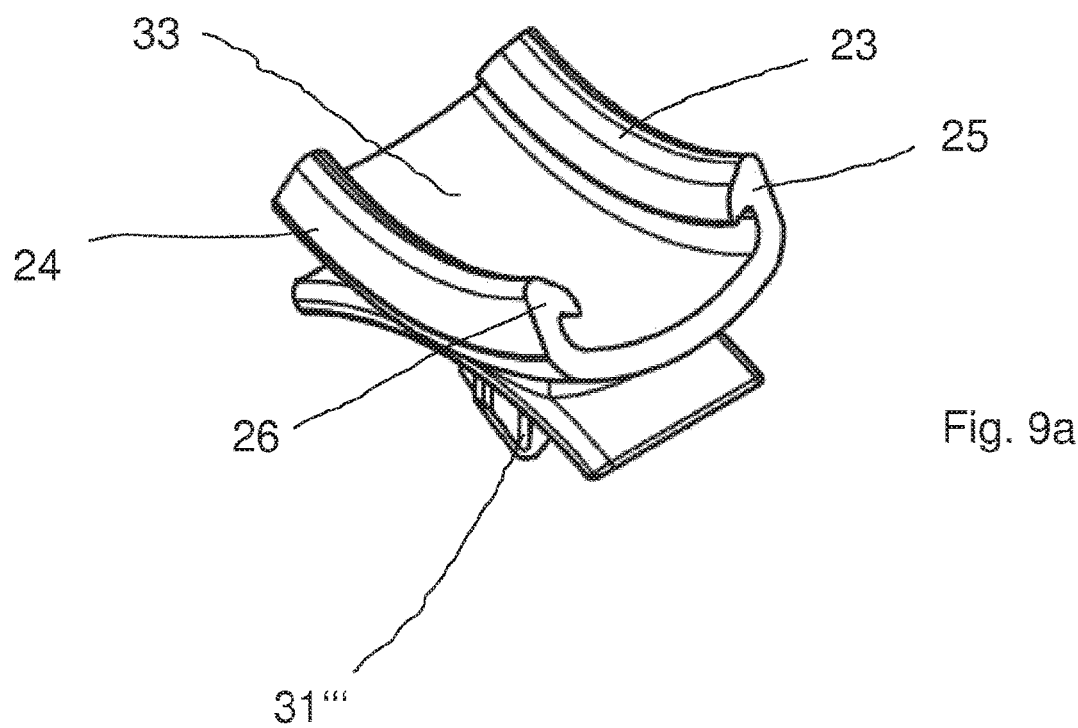

FIG. 9a shows in a topside view and FIG. 9a a bottom-side view of an embodiment, where the fixing means 31'" is an arrow head mount with an arrow head 35.

Figure 10A:
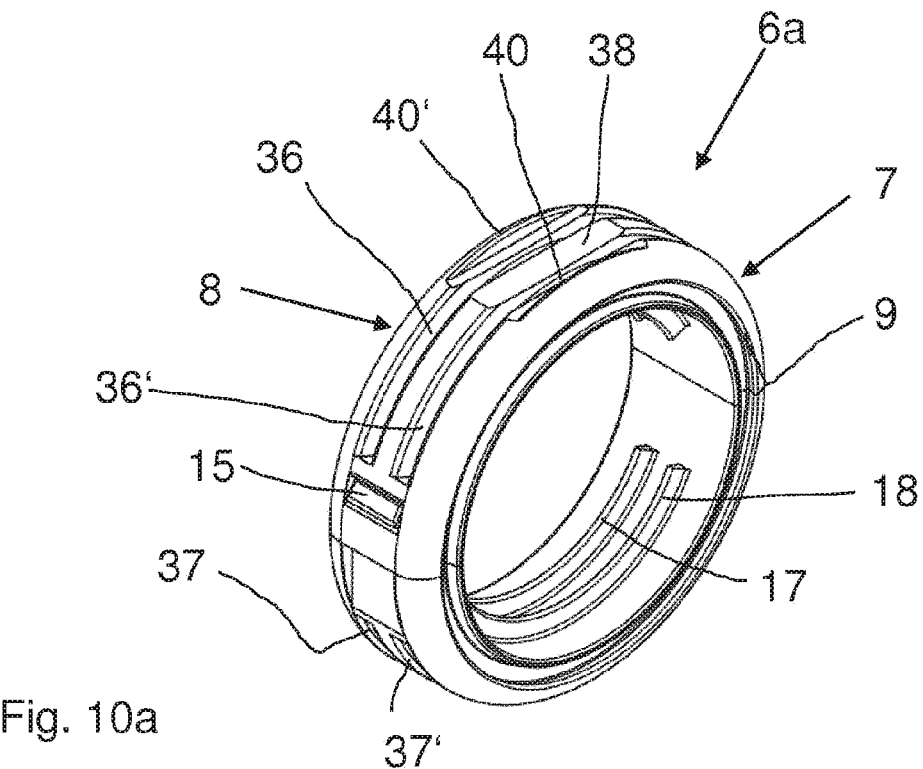
Figure 10B:
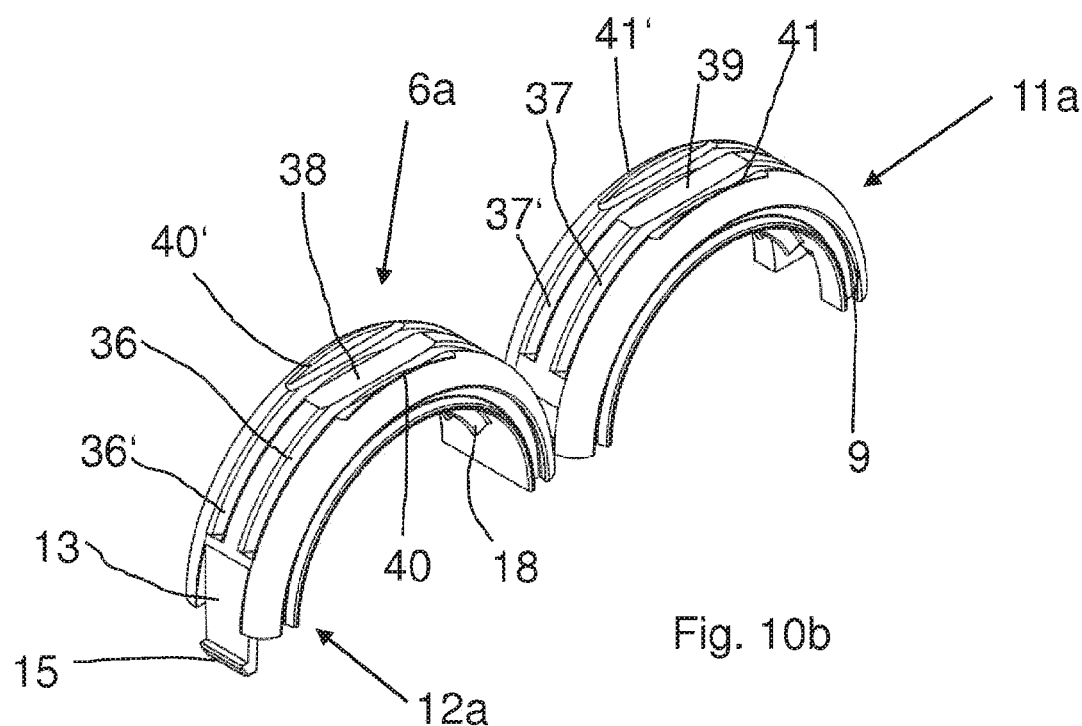
FIG. 10*b* shows the conduit clip in an open configuration.

FIG. 10a shows a conduit clip 6a in a further embodiment, in closed configuration, while FIG. 10b shows the conduit clip 6a in and open configuration. The embodiment shown in FIGS. 10a-b differs from the embodiment shown in FIGS. 2a-b in that the ring member 7 has two pairs of grooves 36, 36', 37, 37' embossed in its circumferentially extending surface 8 and extending lengthwise in a circumferential direction. Due to the embossed grooves 36, 36', 37, 37', the circumferentially smooth envelope of the external surface 8 will not be affected in the sense that still no projections, particularly no parts or sections are extending radially out of the external circumferential surface 8. The advantage of this embodiment is that it enables a stacking of different sized conduit clips into each other, as is shown in FIGS. 11a, 11b, 11c.

The ring member 7 as shown in FIGS. 10a and 10b has two flattenings 38, 39, one of each flattening 38, 39 embossed in a center portion of a segment of the circumferentially extending surface of each ring portion 11a, 12a, in such a way that the edge portions 40, 40', 41, 41' in each segment remain unaffected and form circularly shaped edge portions of the flattening 38, 39. A conduit clip 6a according to this embodiment can be used with a cable tie, without losing the advantage of the circumferentially smooth envelope. The envelope is defined by the circularly shaped edge portions 40, 40', 41, 41' of the flattenings 38, 39, which is unchanged compared to the embodiment without flattening, see FIG. 2. So a cable tie can be inserted on either one of the flattenings 38, 39 an held and guided by and between the circularly shaped edge portions 40, 40', 41, 41', without adding any radially extending parts or portions.

Turning now to FIGS. 11a, 11b, 11c, these show how two or more conduit clips 6c, 6d with different diameters can be assembled into each other creating an enlarger or reducer means. The two or more conduit clips 6c, 6d to be stacked or assembled into each other are designed in such a manner that the outer diameter of the first, smaller conduit clip 6c, measured at its circumferentially smooth envelope, fits the inner diameter of the second, larger conduit clip 6d. The thickness of the ring members 7c, 7d of the conduit clips 6c, 6d are substantially the same. The upstanding projections 18d, 17d at the radially internal surface of the second, larger conduit clip 6d fit into and engages the grooves 36c, 36c' embossed in the circumferentially extending surface of the first, smaller conduit clip 6c, so that due to the projections 18d, 17d fitting into the grooves 36c, 36c' both conduit clips 6c, 6d when assembled into each other are coupled to each other and a relative circular rotation of one of the conduit clips around the other is avoided. The assembly of the two conduit clips 6c, 6d into each other as shown is only possible due to the inventive feature of the circumferentially smooth envelope of the external surface the conduit clip.

FIG. 11c shows an embodiment where three conduit clips 6c, 6d, 6e are assembled onto and into each other, resulting in an even larger degree of reduction. FIG. 11c differs from FIG. 11b in that an additional third conduit clip 6e is forming the center conduit clip. The outer diameter of the third conduit clip 6e matches the inner diameter of the first conduit clip 6c. Apart from the diameter, the conduit clips 6c, 6d, 6e are designed in an identical manner. The thickness of the ring members 7c, 7d, 7e of conduit clips 6c, 6d, 6e are substantially the same.

Figure 12:
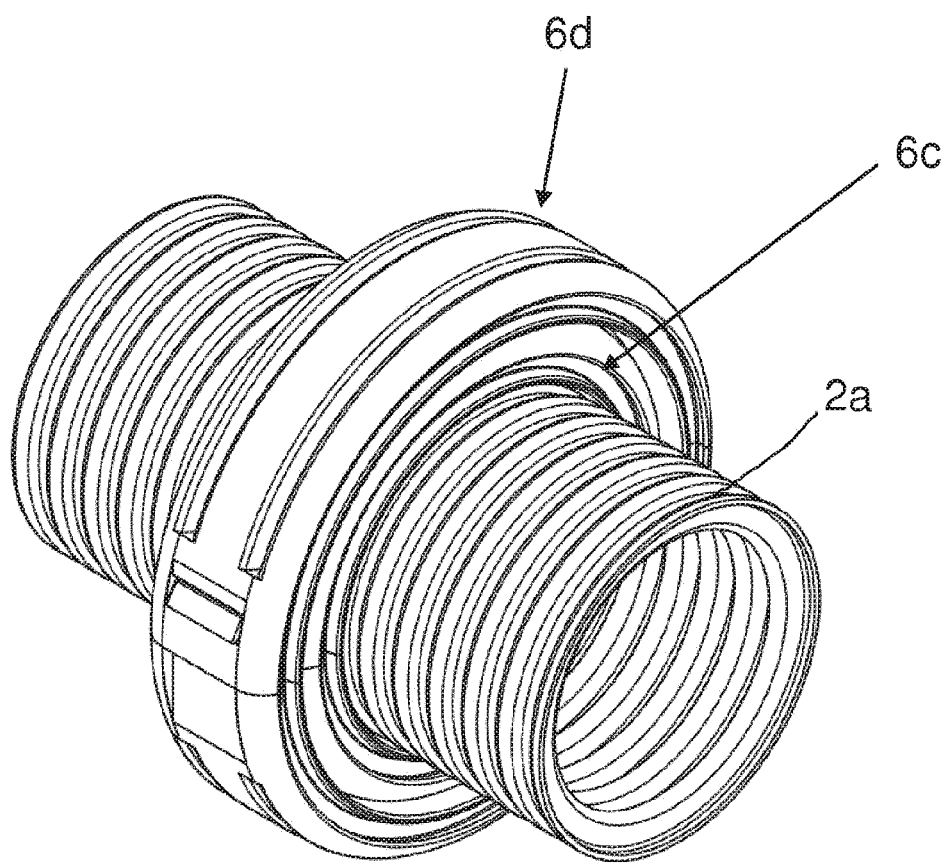
FIG. 12 shows the application of a stacked arrangement of two conduit clips assembled into each other and onto a conduit with a small diameter.

FIG. 12 shows the application of a stacked arrangement of the two conduit clips 6d, 6c shown in FIGS. 11a and 11b, assembled into each other and onto a conduit 2a which has an outer diameter which is substantially smaller than the inner diameter of the second conduit clip 6d. The first, intermediate conduit clip 6c is used to bridge the gap in diameters between the thinner conduit 2a and the second conduit clip 6d. This shows an additional advantage of the conduit clips according to the invention. A design of conduit clips according to the invention provides a toolbox of equally designed conduit clips, having the same thickness of their ring members, having smooth outer envelops so they can be stacked one within the other easily. This offers a large flexibility in realizing conduit clip assemblies with conduits having different diameters and different distances from the conduit to its fixing location. Equilibration of various distances can be simply achieved by adding or removing one or several additional outer conduit clips.

In each of the conduit clip arrangements shown in the FIGS. 10a, 10b, 11a, 11b, 11c and 12, of course, the outer conduit clip in each case can be equipped with one or several attachment members as shown in FIGS. 3 to 9.

Figure 13A:
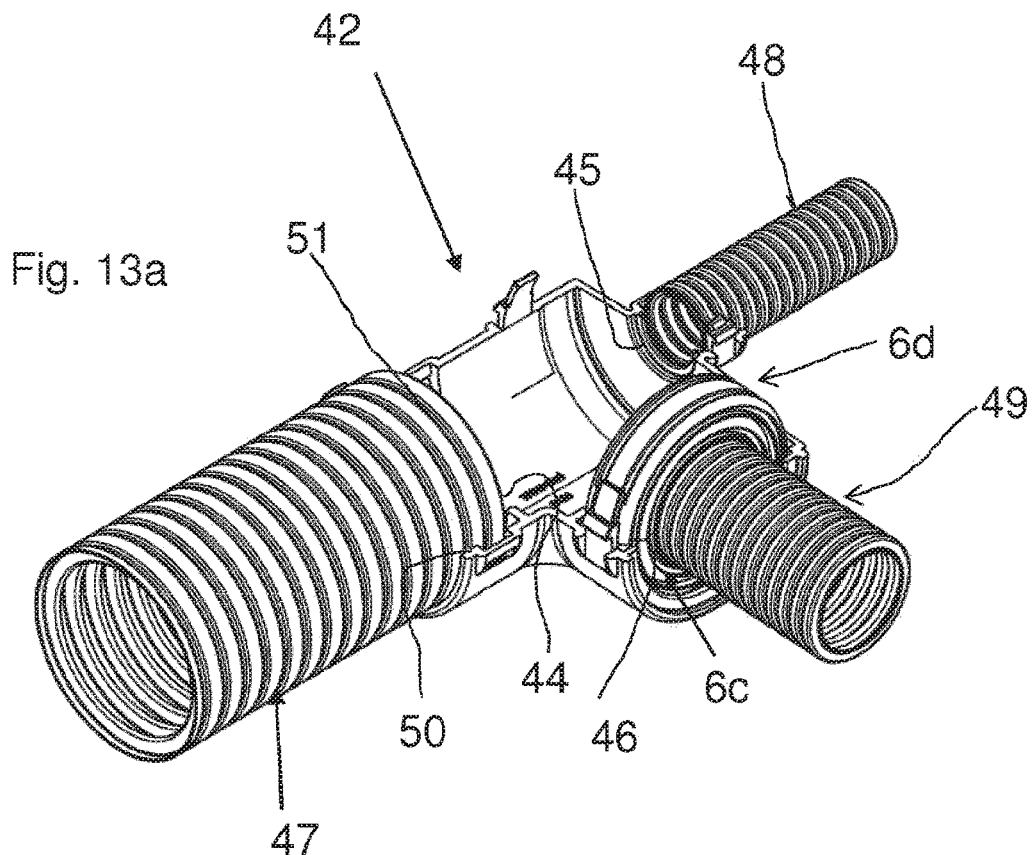
Figure 13B:
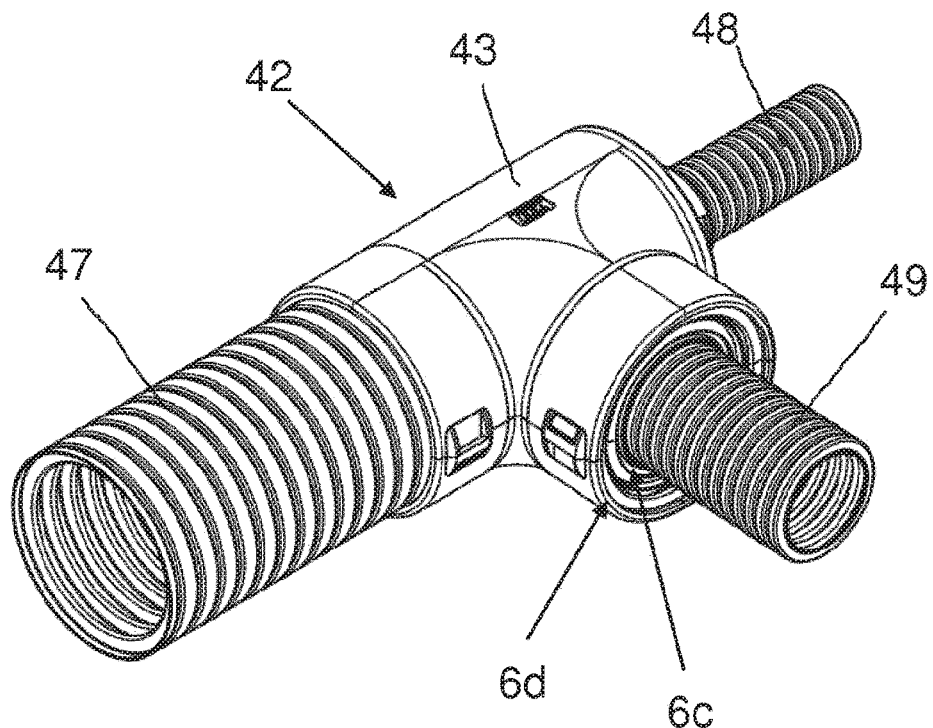
FIG. 13*b* shows the top cover back in place.

FIGS. 13a and 13b show how a conduit clip design according to the invention can be used to reduce outlets size of existing products allowing the use of different sized conduits. For example, if a conduit with a small diameter is to be coupled to a fitting with a larger diameter than the conduit, then for adapting the small diameter of the conduit to the larger diameter of the fitting, one or more conduit clips according to the invention are assembled into each other around the end piece of the conduit, until the outer diameter of the conduit clip arrangement fits the inner diameter of the fitting. FIGS. 13a and 13b show as an exemplary embodiment a T-fitting 42, in FIG. 13a top cover removed, in FIG. 13b top cover 43 closed. T-fitting 42 has three docking openings 44, 45, 46 for the attachment of conduits 47, 48, 49. Each of the docking openings 44, 45, 46 has on its inner circular surface at least one circular upstanding projection 50, which engages with one of the end-standing corrugations 51 of the corrugated conduit when the conduit is docked to and fixed at the respective docking opening. The docking opening 44 on the left-hand side and the docking opening 46 on the front side, arranged in a 90° angle to the docking opening 44, have the same inner diameter. The docking opening 45 on the right-hand side, in straight line with docking opening 44, has a substantially smaller diameter made for attaching a conduit 48 with a substantially smaller diameter than the conduit 47 to be attached to the docking opening 44 on the left-hand side. The diameter of conduit 47 matches the diameter of docking opening 44, and the diameter of conduit 48 matches the diameter of docking opening 45. But the diameter of conduit 49 does not match the diameter of docking opening 46. In the docking opening 46 at the front side a conduit 49 with a smaller diameter than the conduit 47 is to be attached. To match the difference in diameter between the conduit 49 and docking opening 46, a stacked arrangement of two conduit clips 6d, 6c as shown in FIGS. 11a and 11b is mounted around the end section of conduit 49. Thanks to the smooth envelope of conduit clip 6d, the outer one, the conduit clip assembly easily fits into the T-fitting and the top cover 42 can be closed without any disturbing parts protruding out of the conduit clip.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 Conduit clip arrangement
2, 2a Flexible conduit
3 Grooved armored sheath
4 Through axis
4' Through axis
5 Corrugation 6, 6a, 6c, 6d, 6e Conduit clip
7 Ring member
8 External surface
9 Circumferential groove
10 Slot
11, 11a Ring portion
12, 12a Ring portion
13, 13d Male flap
14 Female recess
15, 15d Nose
16 Aperture
17 Upstanding projection
18 Upstanding projection
19 Living hinge
20 Conduit clip arrangement
21 Attachment member
22 Mounting section
23 Abutment
24 Abutment
25 Clamping nose
26 Clamping nose
27 Inclined surface
28 Inclined surface
29 Inclined surface
30 Fixing section
31 Fixture element
31' Fixture element
31" Fixture element
31'" Fixture element
32 Stud
33 Interior surface of mounting section 22
34 Fixture hole
35 Arrow head
36, 36c grove
36', 36c' grove
37 grove
37' grove
38 flattening
39 flattening
40, 40' edge portion
41, 41' edge portion
42 T-fitting
43 Top cover
44 Docking opening
45 Docking opening
46 Docking opening
47 Conduit
48 Conduit
49 Conduit
50 Upstanding projection
51 corrugation

What is claimed is:

1. A conduit clip for use in a conduit clip arrangement together with a conduit, the conduit clip comprising:
a ring member configured to be placed around the conduit, the ring member having a through axis, a circumferential radially internal surface, and a circumferential radially external surface, the ring member comprising semi-circular ring portions connected by a living hinge,
wherein the circumferentially external surface has a circumferentially smooth envelope,
wherein each side wall of the ring member is provided with a clamping device configured to cooperate with an attachment member,
wherein the circumferential radially internal surface has at least one upstanding projection configured to engage a groove in the conduit sheath when placed around it, and
wherein the ring member has at least one groove embossed in its circumferentially extending surface and extending lengthwise in a circumferential direction.

2. The conduit clip according to claim 1, wherein the projection is shaped as a circular rib.

3. The conduit clip according to claim 1, wherein the ring member includes a latch engageable in a closed condition thereof.

4. The conduit clip according to claim 3, wherein the latch is releasable.

5. The conduit clip according to claim 1, wherein the ring member has a number of grooves embossed in its circumferentially extending surface and that extend lengthwise in a circumferential direction, and
wherein the grooves are matching in number and position with the upstanding projections at the circumferential radially internal surface.

6. A conduit clip for use in a conduit clip arrangement together with a conduit, the conduit clip comprising:
a ring member configured to be placed around the conduit, the ring member having a through axis, a circumferential radially internal surface, and a circumferential radially external surface, the ring member comprising semi-circular ring portions connected by a living hinge,
wherein the circumferentially external surface has a circumferentially smooth envelope,
wherein each side wall of the ring member is provided with a clamping device configured to cooperate with an attachment member,
wherein the circumferential radially internal surface has at least one upstanding projection configured to engage a groove in the conduit sheath when placed around it, and
wherein the ring member has at least one flattening embossed in a center portion of a segment of its circumferentially extending surface, such that the edge portions in the segment remain unaffected and form circularly shaped edge portions of the flattening.

7. A conduit clip arrangement, comprising:
a conduit having a generally cylindrical shape with a through axis and a grooved outer form, a grooved armoured sheath of the conduit having a circumferential radially external surface with a number of axially adjacent circular corrugations and being lengthwise split parallel to the through axis;
a conduit clip for use in a conduit clip arrangement together with a conduit, the conduit clip comprising:
a ring member configured to be placed around the conduit, the ring member having a through axis, a circumferential radially internal surface, and a circumferential radially external surface, the ring member comprising semi-circular ring portions connected by a living hinge,
wherein the circumferentially external surface has a circumferentially smooth envelope,
wherein each side wall of the ring member is provided with a clamping device configured to cooperate with an attachment member, and
wherein the circumferential radially internal surface has at least one upstanding projection configured to engage a groove in the conduit sheath when placed around it; and
an attachment member, the attachment member and the ring member being arranged to clamp together;
wherein the clamping device comprises a circumferential groove and the attachment member has a mounting section which provides abutments configured to engage in the circumferential groove to clamp the attachment member to the ring member.

8. The conduit clip arrangement according to claim 7, wherein the attachment member has a fixing section providing a fixture element configured to attach the attachment member at a mounting location.

9. The conduit clip arrangement according to claim 8, wherein the fixture element comprises a fir tree type fixture, an arrow head type fixture, a p-clip type fixture having a hole, or a stud mount type fixture.

10. The conduit clip according to claim 6, wherein the projection is shaped as a circular rib.

11. The conduit clip according to claim 6, wherein the ring member includes a latch engageable in a closed condition thereof.

12. The conduit clip according to claim 11, wherein the latch is releasable.

13. The conduit clip according to claim 6, wherein the ring member has a number of grooves embossed in its circumferentially extending surface and that extend lengthwise in a circumferential direction, and wherein the grooves are matching in number and position with the upstanding projections at the circumferential radially internal surface.

14. The conduit clip arrangement according to claim 7, wherein the projection is shaped as a circular rib.

15. The conduit clip arrangement according to claim 7, wherein the ring member includes a latch engageable in a closed condition thereof.

16. The conduit clip arrangement according to claim 11, wherein the latch is releasable.

17. The conduit clip arrangement according to claim 7, wherein the ring member has a number of grooves embossed in its circumferentially extending surface and that extend lengthwise in a circumferential direction, and wherein the grooves are matching in number and position with the upstanding projections at the circumferential radially internal surface.

* * * * *